United States Patent [19]

Iida

[11] Patent Number: 5,374,998
[45] Date of Patent: Dec. 20, 1994

[54] DATA LINK CONTROL METHOD FOR CONTROLLING RECEIVER AND TRANSMITTER

[75] Inventor: Masaharu Iida, Atsugi, Japan

[73] Assignee: Ricoh Company, Ltd., Tokyo, Japan

[21] Appl. No.: 687,618

[22] Filed: Apr. 19, 1991

[30] Foreign Application Priority Data

May 7, 1990 [JP] Japan .................................. 2-115778
Sep. 20, 1990 [JP] Japan .................................. 2-248824

[51] Int. Cl.⁵ ...................... H04N 1/04; H04N 1/36; H04N 1/41
[52] U.S. Cl. .................... 358/486; 358/409; 358/431
[58] Field of Search ............... 358/400, 409, 412, 426, 358/261.1, 431, 434, 435, 436, 438, 439, 486

[56] References Cited

U.S. PATENT DOCUMENTS

| | | | |
|---|---|---|---|
| 4,549,221 | 10/1985 | Yamamoto et al. | 358/431 |
| 4,586,088 | 4/1986 | Kondo | 358/431 |
| 4,661,857 | 4/1987 | Kondo | 358/431 |
| 4,719,514 | 1/1988 | Kurahayashi et al. | 358/431 |
| 4,775,893 | 10/1988 | Ishikawa | 358/431 |
| 4,947,268 | 8/1990 | Nakajiri et al. | 358/431 |

FOREIGN PATENT DOCUMENTS

| | | |
|---|---|---|
| 3606661 | 9/1986 | Germany . |
| 23967 | 2/1984 | Japan . |
| 30363 | 2/1984 | Japan . |
| 144274 | 8/1984 | Japan . |
| 63-187773 | 8/1988 | Japan . |

*Primary Examiner*—Edward L. Coles, Sr.
*Assistant Examiner*—Thomas D. Lee
*Attorney, Agent, or Firm*—Oblon, Spivak, McClelland, Maier & Neustadt

[57] ABSTRACT

In a data link control method, a receiver and a transmitter are connected so that the transmitter can transmit every line of a predetermined data at a first speed, the receiver plotting every line of the predetermined data on a recording paper thereof at a second speed. A predetermined mode is selected from either a buffer mode or a skip mode on the basis of a ratio of the first speed to the second speed and whether a buffer can be used by the receiver. The predetermined data is temporarily stored in the buffer and then plotted during the buffer mode. The recording paper of the receiver is fed at a third speed higher than a normal speed when a blank line of the predetermined data is plotted thereon during the buffer mode and skip mode. A data amount of the blank line being reduced to a ratio of the normal speed of the recording paper to the third speed thereof and a fill-bit representing 0 being added to the data amount of the blank line reduced during the skip mode so that the transmitting operation of the transmitter can be synchronized with the plotting operation of the receiver.

13 Claims, 14 Drawing Sheets

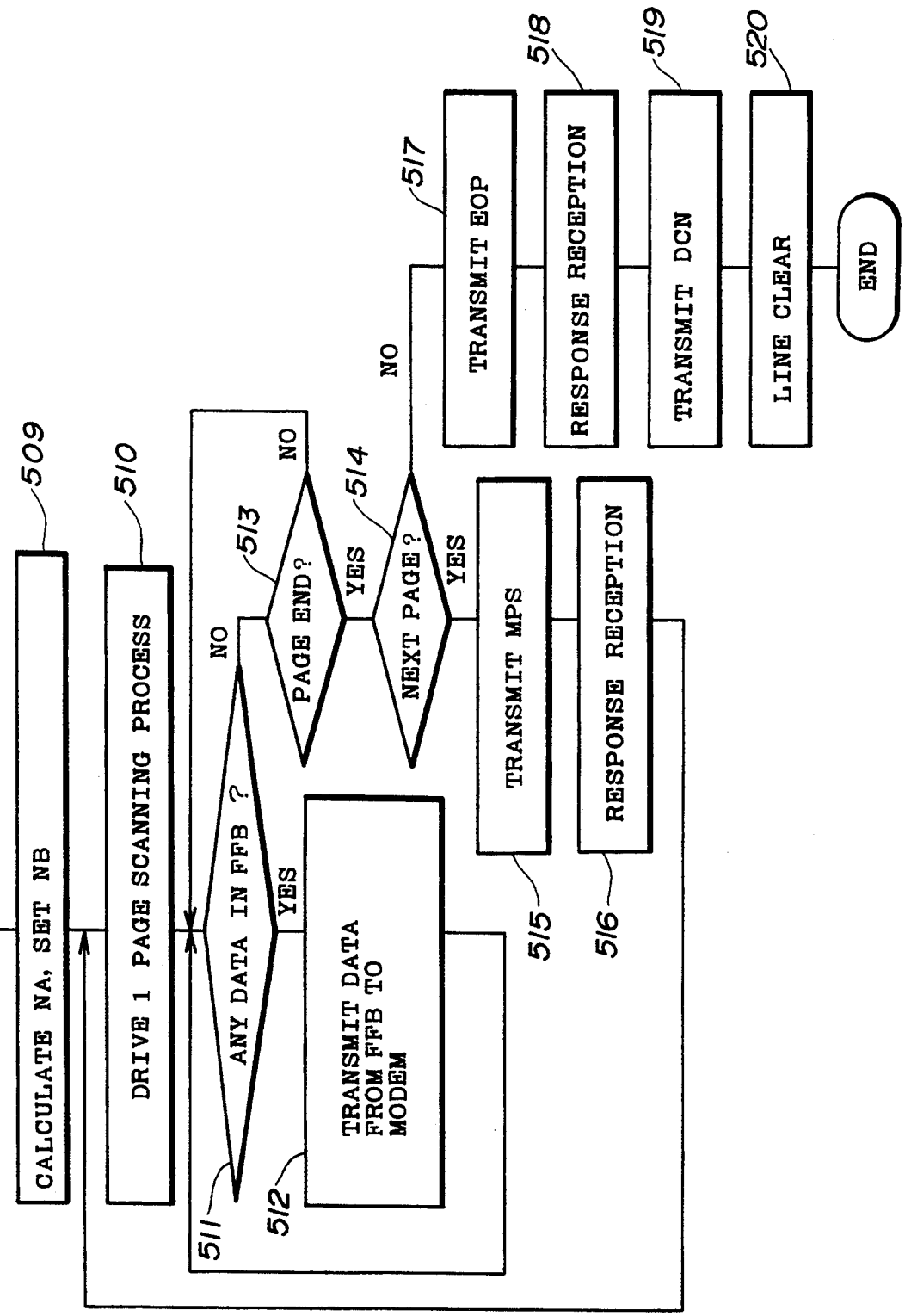

DATA LINK CONTROL METHOD FOR CONTROLLING RECEIVER AND TRANSMITTER

BACKGROUND OF THE INVENTION

The present invention relates generally to data link control methods, and more particularly to a data link control method for controlling the receiver and transmitter so that a data transmission time can be shortened even though the receiver has a relatively long minimum recording time.

A well-known facsimile apparatus (abbreviated FAX hereinafter) comprises a scanner, an encoder/decoder, a memory, and a plotter. The scanner scans every line of an image on a document to generate a image signal corresponding to the image. The encoder/decoder encodes the image signal for every line into image data and decodes the image data for every line into the image signal. Thus, the FAX transmits and/or receives an image data corresponding to a predetermined image for every line. The image data comprises, as shown in FIG. 1A and 1B, an end-of-line signal (abbreviated EOL hereinafter) representing an end of a line, code data representing the predetermined image for one line, and a fill-bit representing "0". Hereupon, Na denotes a bit number of the image data, Nc denotes the sum of the bit number of the EOL and the code data, and Nf denotes that of the fill-bit. The fill-bit is added when Nc is less than Na which is determined by the minimum recording time and the data transmission speed so that the scanning operation of the transmitter can be synchronized with the plotting operation of the receiver. The image data transmission time can be shortened by accelerating the data transmission speed or by lessening the bit number of the image data. Since the highest data transmission speed is 9600 bps determined by a V.29 MODEM according to Comite Consultatif International Telegraphique et Telephonique (abbreviated CCITT hereinafter), the bit number of the image data should be lessened by deleting the fill-bit. That is, the minimum recording time for 1 line of a receiver is required to be less than the scanning time for 1 line of a transmitter. But a thermal printer which is generally equipped with the conventional FAX and operates at a relatively low speed cannot satisfy the request. Accordingly, a skip mode has been proposed to cope with the request. In this mode, as shown in FIG. 1C, the fill-bit is added to Nc comprising the EOL and blank line so that the sum of bit number of the EOL, the blank line, and the fill-bit can correspond to ½ Na. The terms "blank line", as used hereinafter, means a line on which the image does not exist. The data amount of the blank line is reduced to a ratio of a normal speed of the recording paper to a feeding speed thereof. In this case, since, when the receiver detects the blank line, it feeds the recording paper at the feeding speed which is twice as fast as the normal speed, the data amount of the blank lines is reduced to half thereof.

Thus, since the data amount of the blank line is limited to half thereof and the feeding speed of the blank line during plotting is set to be twice as fast as the normal speed, the plotting operation of the receiver can be synchronized with the scanning operation of the transmitter. For example, when the minimum recording time is assumed to be 10 ms and the data transmission speed 9600 bps, the minimum confirmation bit number NA becomes 96 bits and half thereof becomes 48 bits. In addition, when a scanning width is A4 and a pixel density is 8 dot/mm, the pixel number for 1 line becomes 1728. Therefore the code data representing the blank line becomes 17 bits in MH encoding. Since the bit number of the EOL is 12 bits, the sum of the bit number of the EOL and the blank line code becomes 29 bits, which is less than 48 bits, so that the fill-bit having 19 bits is added thereto. Thus, the data amount of the blank line which is a large amount of the normally transmitted image data can be surprisingly deleted, so that the image data transmission time for 1 page can be shortened.

However, the conventional data link control method has the following disadvantage when the bit number of the blank line is too small for Na. That is, for example, when the minimum recording time is assumed to be 20 ms and the data transmission speed 9600 bps, the minimum confirmation bit number NA becomes 192 bits and half thereof becomes 96 bits. Therefore, when the blank line is transmitted by the above skip mode, the fill-bit having 67 bits is added to the blank line, and thus the data transmission time cannot be effectively shortened.

SUMMARY OF THE INVENTION

Accordingly, it is a general object of the present invention to provide a novel and useful data link control method in which the above problem is eliminated.

Another object of the present invention is to provide a data link control method for controlling the receiver and the transmitter which shortens a data transmission time in a case where the minimum recording time for 1 line of the receiver is relatively long.

The more specific object of the present invention is to provide a data link control method for controlling a receiver and a transmitter which communicate with each other in a predetermined mode, comprising the steps of connecting the receiver and the transmitter so that the transmitter can transmit every line of a predetermined data at a first speed, the receiver plotting every line of the predetermined data on a recording paper thereof at a second speed, and selecting the predetermined mode from either a buffer mode or a skip mode on the basis of a ratio of the first speed to the second speed and whether a buffer can be used by the receiver, the predetermined data being temporarily stored in the buffer in the receiver and then plotted during the buffer mode, the recording paper of the receiver being fed at a third speed higher than a normal speed when a blank line of the predetermined data is plotted thereon during the buffer mode and skip mode, and a data amount of the blank line being reduced to a ratio of the normal speed of the recording paper to the third speed thereof and a fill-bit representing 0 being added to the data amount of the blank line reduced during the skip mode so that the transmitting operation of the transmitter can be synchronized with the plotting operation of the receiver.

Another more specific object of the present invention is to provide a data link control method for controlling a receiver and a transmitter which communicate with each other in a predetermined mode, both the receiver and the transmitter having buffers in which every line of a predetermined data to be transmitted and/or received is temporarily stored, the transmitter transmitting every line of the predetermined data to the receiver at a first speed, and the receiver plotting every line of the predetermined data on a recording paper thereof at a second speed, comprising the steps of connecting the receiver and the transmitter, monitoring a data amount of the predetermined data stored in the buffers, the predetermined data being temporarily stored in the buffer when the first speed is higher than the second speed, and controlling the first speed based on the data amount of the predetermined data stored in the buffers.

Still another more specific object of the present invention is to provide a data link control method for controlling a receiver and a transmitter which communicate with each other in a predetermined mode, both the transmitter and the receiver having buffers in which a predetermined data to be transmitted and/or received is temporarily stored, comprising the steps of connecting the receiver and the transmitter so that the transmitter can transmit every line of a predetermined data at a first speed, the receiver plotting every line of the predetermined data on a recording paper thereof at a second speed, selecting the predetermined mode from either a buffer mode or a skip mode based on a ratio of the first speed to the second speed, the predetermined data being temporarily stored in the buffer in the receiver and then plotted during the buffer mode, the recording paper of the receiver being fed at a third speed higher than a normal speed when a blank line of the predetermined data is plotted thereon during the buffer mode and skip mode, and a data amount of the blank line being reduced to a ratio of the normal speed of the recording paper to the third speed thereof and a fill-bit representing 0 being added to the data amount of the blank line reduced during the skip mode so that the transmitting operation of the transmitter can be synchronized with the plotting operation of the receiver, monitoring a data amount of the predetermined data stored in the buffers, and controlling the first speed based on the data amount of the predetermined data stored in the buffers.

According to one aspect of the present invention, the receiver plots the blank line at a speed higher than the normal speed, so that the data transmission time for 1 line can be shortened. According to another aspect of the present invention, the data transmission speed is controlled based on the data amount of the predetermined data stored in the buffer, so that the data transmission is effectively performed.

Other objects and further features of the present invention will become apparent from the following description when read in conjunction with the accompanying drawings.

DESCRIPTION OF THE PREFERRED EMBODIMENTS

Figures 1A, 1B, 1C:
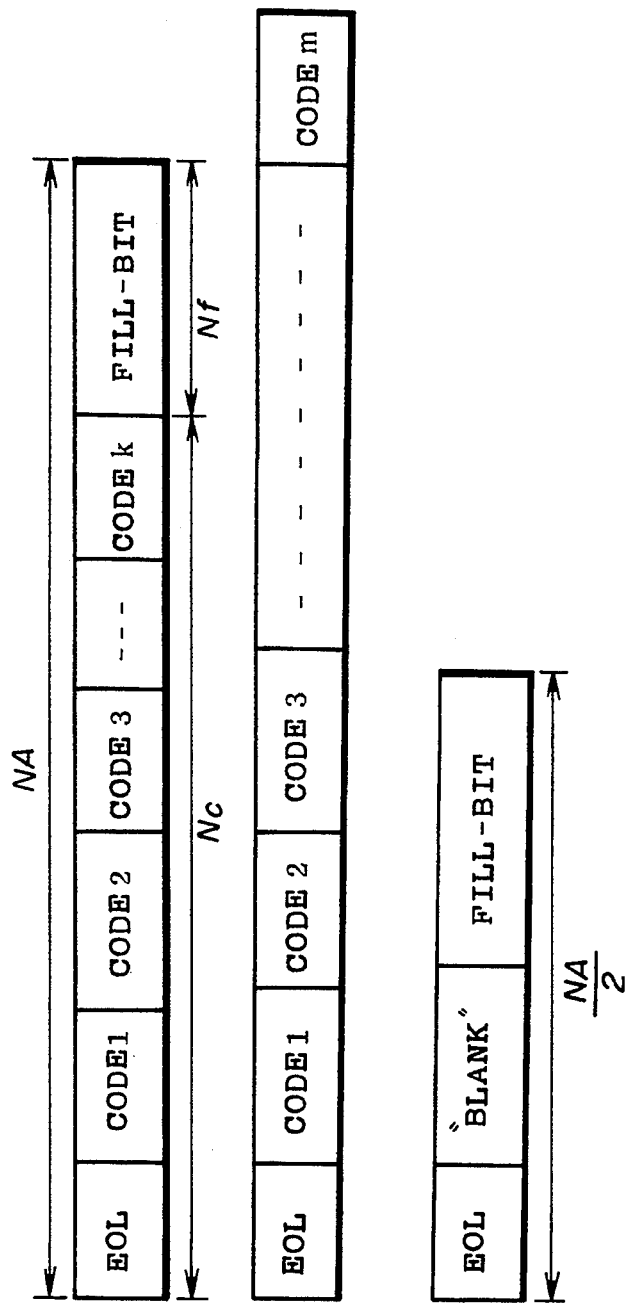
FIGS. 1A and 1b respectively show an image data for 1 line.
FIG. 1C shows a blank line in a skip mode.
Figure 2:
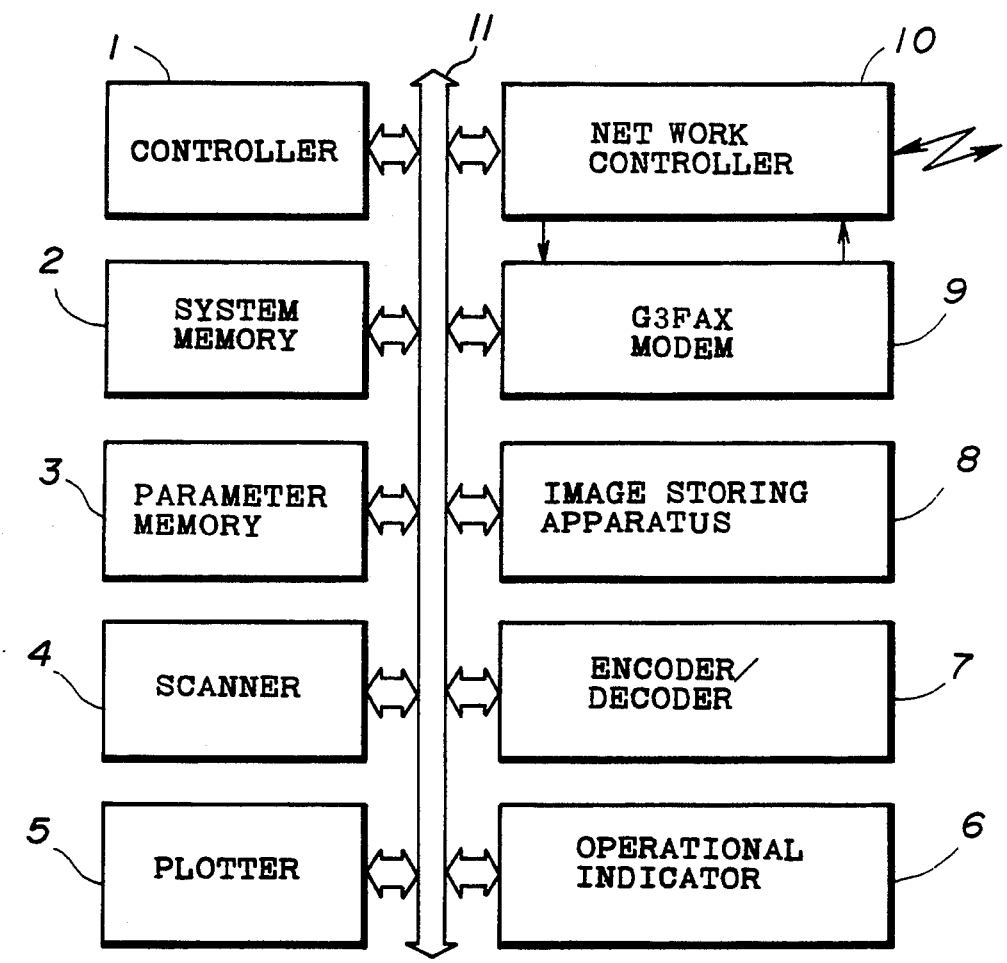
FIG. 2 shows a block diagram of a group 3 facsimile apparatus according to the present invention.

The group 3 FAX according to the present invention comprises a controller 1, a system memory 2, a parameter memory 3, a scanner 4, a plotter 5, an operation indicator 6, an encoder/decoder 7, an image storing apparatus 8, a group 3 facsimile MODEM 9, and a network controller 10. The controller 1 controls the general operation of each part of the FAX, and the transmission procedure of this FAX. The system memory 2 stores some programs used for the above procedure and various items of information required for executing the above programs therein. The system memory 2 functions as a working area of the controller 1. The parameter memory 3 stores various items of information peculiar to this FAX. The scanner 4 scans a predetermined image with a predetermined resolution. The plotter 5 outputs with a resolution the predetermined image, and the operation indicator 7 indicates the operation of this FAX. The encoder/decoder 7 encodes the image signals into the image data and/or decodes the image data into the image signals. The G3 facsimile MODEM 9 comprises a low speed modem (V.21 MODEM) and a high speed MODEM (V.29 MODEM and V.27ter MODEM). The network controller 10 connects this FAX to the telephone line network, and has an automatic send receive function. The controller 1, system memory 2, parameter memory 3, scanner 4, plotter 5, operation indicator 6, encoder/decoder 7, image storing device 8, G3 facsimile MODEM 9, and the network controller are respectively coupled to a system bus so as to communicate with each other. Incidentally, the network controller 10 directly communicates with the G3 facsimile MODEM 9.

Figure 3:
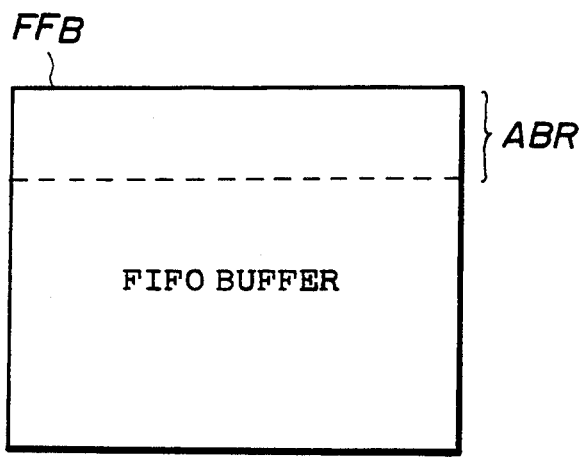
FIG. 3 shows an example of an FIFO buffer.

The system memory 2 comprises a first in first out (abbreviated FIFO) buffer FFB, as shown in FIG. 3. Additionally, the system memory 2 further comprises a line buffer which temporarily stores the image signal scanned by the scanner 4. In this FAX, the controller 1 executes a skip mode during data transmission in a case where the minimum recording time of the communicatee FAX is 10 ms, and executes a buffer mode in a case where the minimum recording time thereof is 20 ms.

A description will now be given of a buffer mode. The buffer mode is used when the data transmission speed from a transmitter to a receiver is higher than the plotting speed of the receiver. The receiver temporarily stores the reception image data in the FIFO buffer FFB, and thus the data transmission timing of the transmitter is controlled by the capacity of the FIFO buffer FFB. Since, if the capacity of the FIFO buffer FFB of the transmitter is as large as that of the receiver, the receiver cannot (overflow) plot all the transmitted image data, the capacity of the FIFO buffer FFB of the transmitter is set to be smaller than that of the receiver. For example, if the scanning time for 1 line of the transmitter is assumed to be 10 ms, the minimum recording time of the receiver be 20 ms, and the transmission speed 9600 bps, the capacity of the FIFO buffer FFB of the transmitter may be experientially set to be ¼ that of the receiver, as shown in FIG. 3. When the receiver detects the blank line, it feeds the recording paper at a speed twice as fast as the normal speed, and consequently the image recording time for 1 page is shortened.

Figure 4:
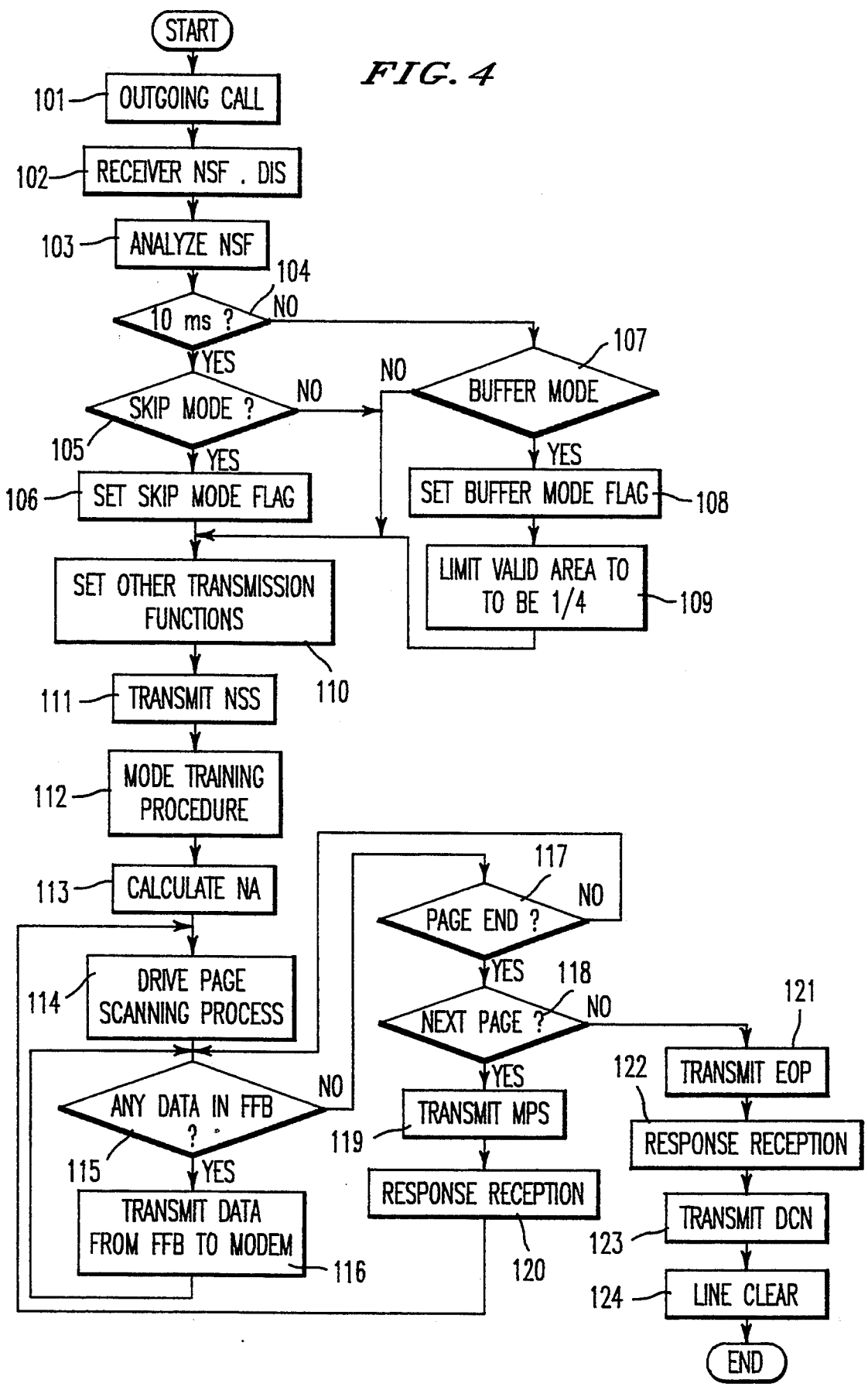
FIG. 4 shows a data transmission procedure of the facsimile apparatus.

A description will now be given of the data transmission procedure of this FAX with reference to FIG. 4. In this case, the minimum recording time selected may be 10 ms or 20 ms. First, steps 101 and 102 transmit the outgoing call to the designated terminal to receive the non-standard facilities (abbreviated NSF hereinafter) and the digital identification signal (abbreviated DIS hereinafter) from the terminal, and a step 103 analyzes the NSF. If the minimum recording time is 10 ms, a step 105 judges whether or not the skip mode of the terminal can be used. If the skip mode can be operated, a step 106 sets a skip mode flag.

On the other hand, if the minimum recording time is 20 ms, a step 107 judges whether or not the terminal can use the buffer mode. Thus judgement includes a step which determines whether or not the FIFO buffer FFB in the designated terminal can be used for the buffer mode by an analyzed NFS signal. If the terminal can use the buffer mode, a step 108 sets a buffer mode flag, and a step 109 sets the valid area of the FIFO buffer FFB to be ¼ that of the receiver. After the setting of the transmission mode, a step 110 sets other transmission functions, and a step 112 transmits a non-standard facilities set-up (abbreviated NSS hereinafter) to the terminal and executes the MODEM training procedure at a transmission speed set at that time.

Subsequently, a step 113 calculates the minimum confirmation bit number NA based on the minimum recording time and the transmission speed, and a step 114 scans and encodes a predetermined image for 1 page. Then, a step 115 judges whether or not the data is stored in the FIFO buffer FFB, and a step 116 transmits the data to the G3 facsimile MODEM 9. If the step 115 judges NO, a step 117 judges whether or not the scanning process and the image data transmission for 1 page are ended. If the step 117 judges NO, the procedure is transferred to the step 115, but if the step 117 judges YES, a step 118 judges whether or not the document of the next page is set at the scanner 4. If the step 118 judges YES, a step 119 transmits the multiplex page signal (abbreviated MPS hereinafter) representing a subsequent page to the terminal and a step 120 receives the response signal therefrom, the procedure then being transferred to the step 114.

If the 118 judges no, a step 121 transmits an end of procedure (abbreviated EOP hereinafter), and a step 122 receives the response signal from the terminal. Lastly, a step 123 transmits a disconnect thereto, and a step 124 clears the line.

Figure 5:
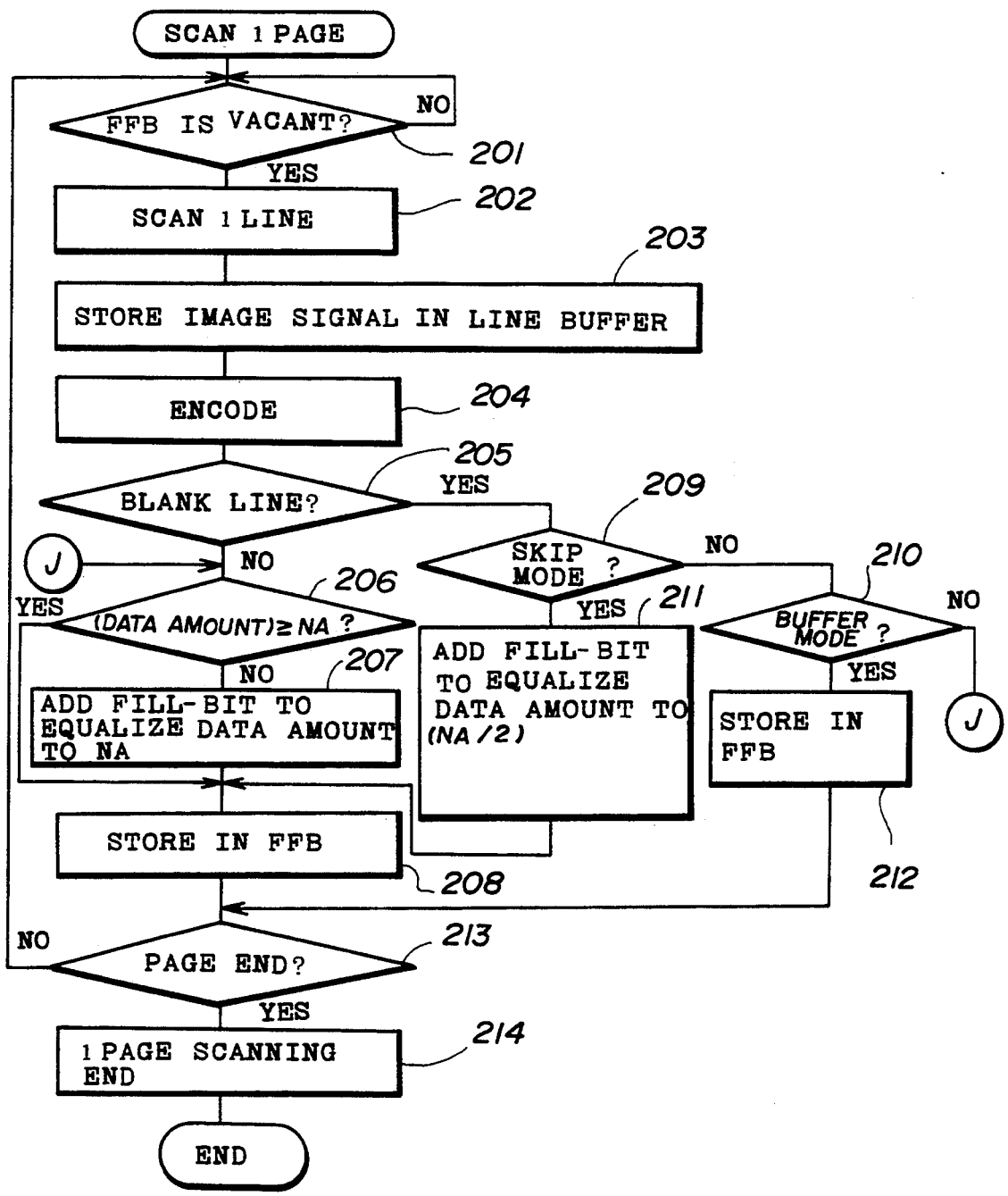
FIG. 5 shows a data reception procedure of the facsimile apparatus.

FIG. 5 shows a scanning procedure for 1 page. Hereupon, in this process, the scanning time for 1 line is 10 ms.

First, a step 201 monitors the vacant area of the FIFO buffer FFB. If the FIFO buffer FFB has the vacant area, a step 202 scans an image data for 1 line, a step 203 temporarily stores the image signal in the line buffer in the system memory 2, and a step 204 encodes the image signal into the image data via the encoder/decoder 7.

A step 205 judges whether or not the line is the blank line. If the step 205 judges NO, a step 206 judges whether or not the bit number of the image data for 1 line is more than the minimum confirmation bit number NA. If the step 206 judges NO, a step 207 adds the fill-bit to the image data so that the bit number for 1 line of the image data can be equal to the minimum confirmation bit number NA and a step 208 stores the data at the front end of the vacant area of the FIFO buffer FFB.

If the step 205 judges YES, steps 209 and 210 judge whether or not the skip mode flag or buffer mode flag is set. If the skip mode flag is set and the step 209 judges YES, a step 211 adds the fill-bit to the image data so that the bit number for 1 bit of the image data can be equal to half of the minimum confirmation bit number NA and the procedure is transferred to the step 208. If the buffer mode flag is set and the step 210 judges YES, a step 212 stores an encode data for 1 line in the vacant area of the FIFO buffer FFB. Then a step 213 judges whether or not the image data for 1 page is scanned. If the step 213 judges NO, the procedure is transferred to the step 201. On the other hand, if the step 213 judges YES, a step 214 sets the status representing that the scanning of the image data for 1 page is finished, and the procedure is terminated. Thus, the minimum recording time of the terminal is 10 ms for an image data transmission, but the FAX sets the skip or buffer mode appropriate to the terminal.

Figure 6A:
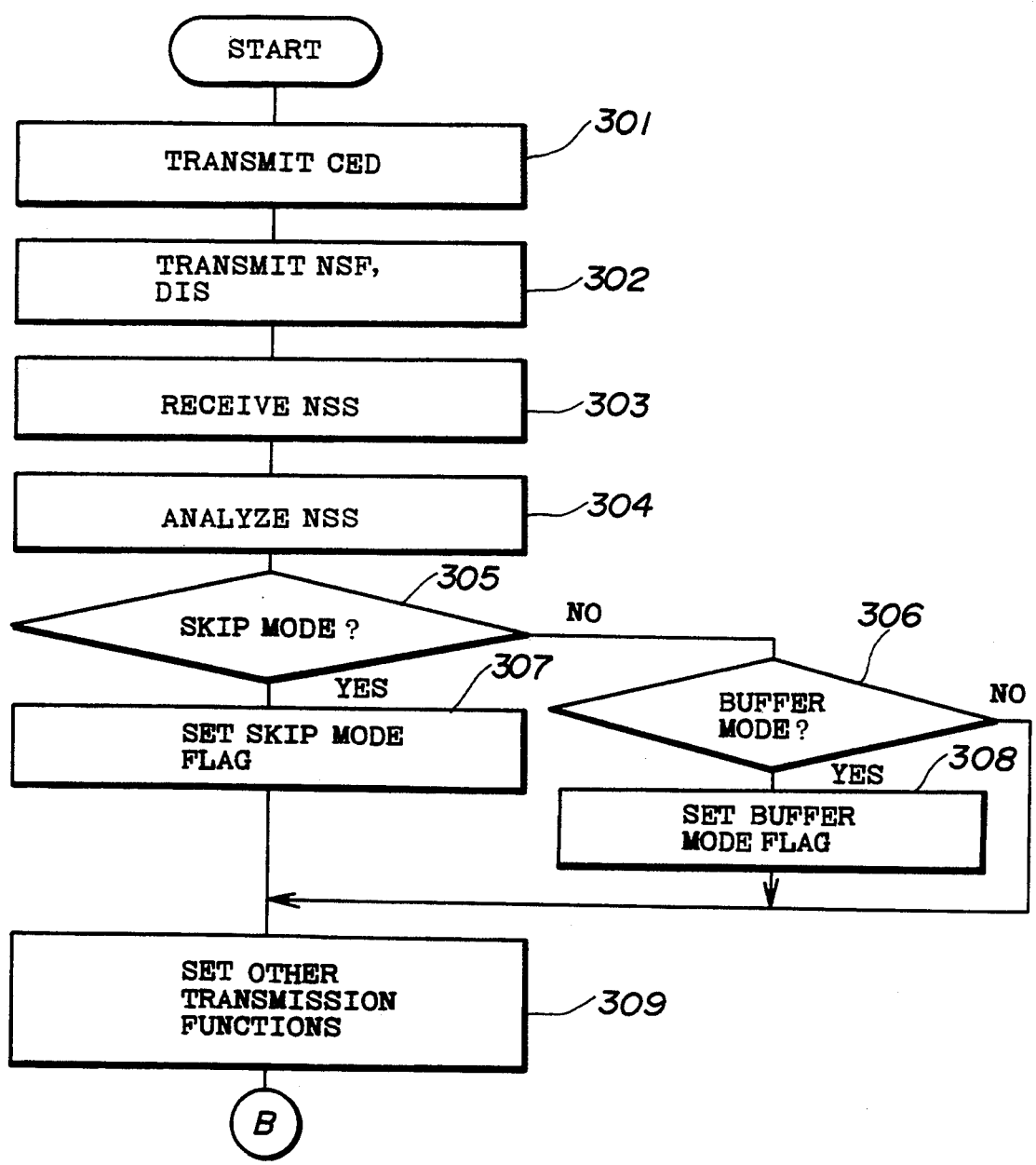
FIG. 6 shows a scanning procedure of the facsimile apparatus.
Figure 6B:
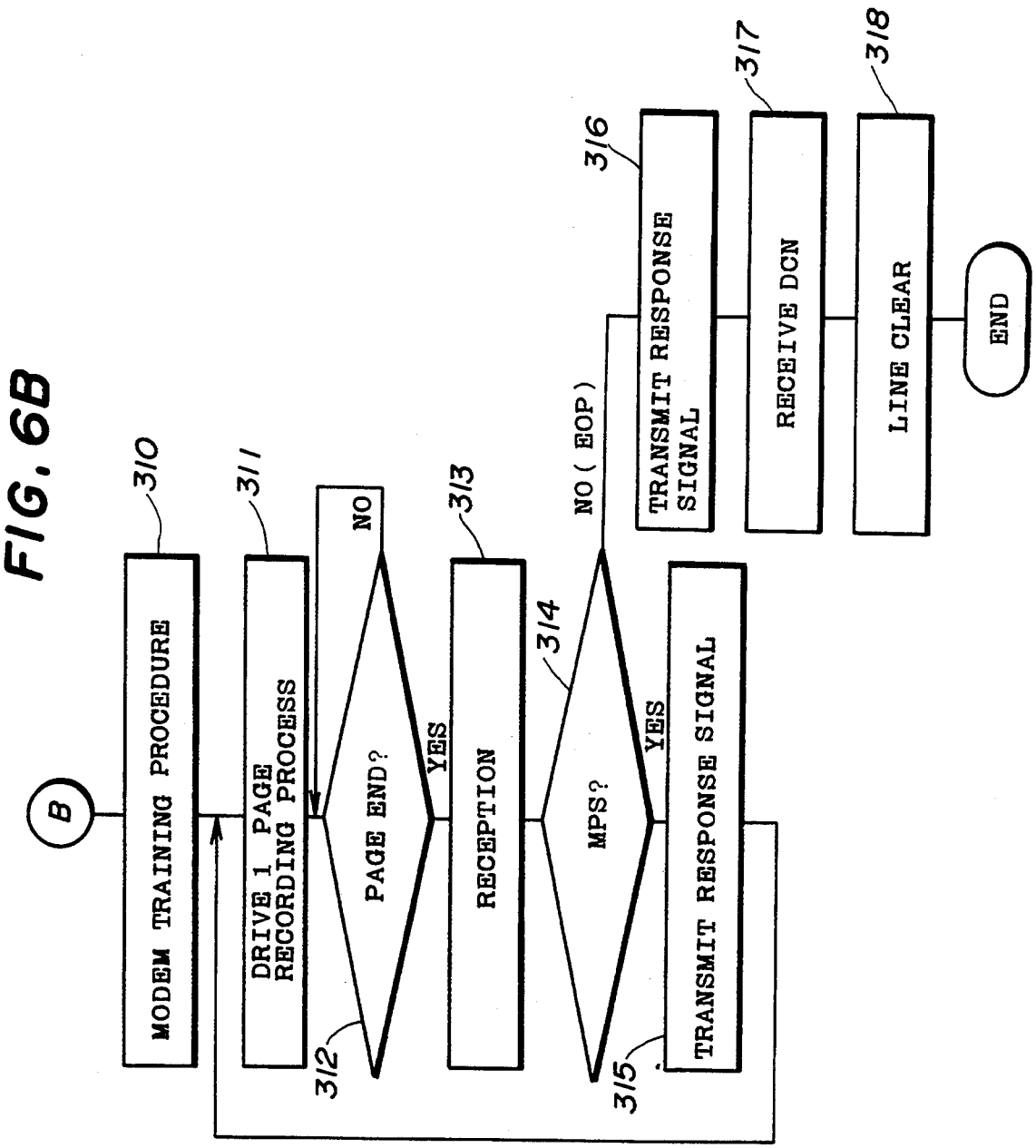

FIG. 6 shows a reception procedure of this FAX. First, a step 301 transmits a called station identification (abbreviated CED hereinafter) to the terminal in response to an incoming call. Next, a step 302 transmits the NSF and the DIS to the terminal and a step 303 receives the NSS therefrom. A step 304 analyzes the NSS and steps 305 and 306 judge whether the skip mode or the buffer mode is set. If the skip mode is set so that the step 305 judges YES, a step 307 sets the skip flag. However, if the buffer mode is set so that the step 305 judges NO, a step 308 sets the buffer mode flag. Subsequently, a step 309 sets other transmission functions and a step 310 executes the MODEM training procedure at a transmission speed. Then, a step 311 drives the 1 page recording process which plots the received image data for 1 page, and a step 312 waits for the end of the recording output of the received image for 1 page.

After the recording output of the received image for 1 page is terminated and the step 312 judges YES, a step 313 receives the message end signal, and a step 314 judges the NPS. If the step 314 judges YES, a step 315 transmits the response signal based on the image data reception result, and thus the procedure is transferred to the step 311. However, if the step 314 judges NO, a step 316 transmits the response signal to the terminal. Then, a step 317 receives DCN and a step 318 clears the line so that the image data reception operation is terminated.

Figure 7:
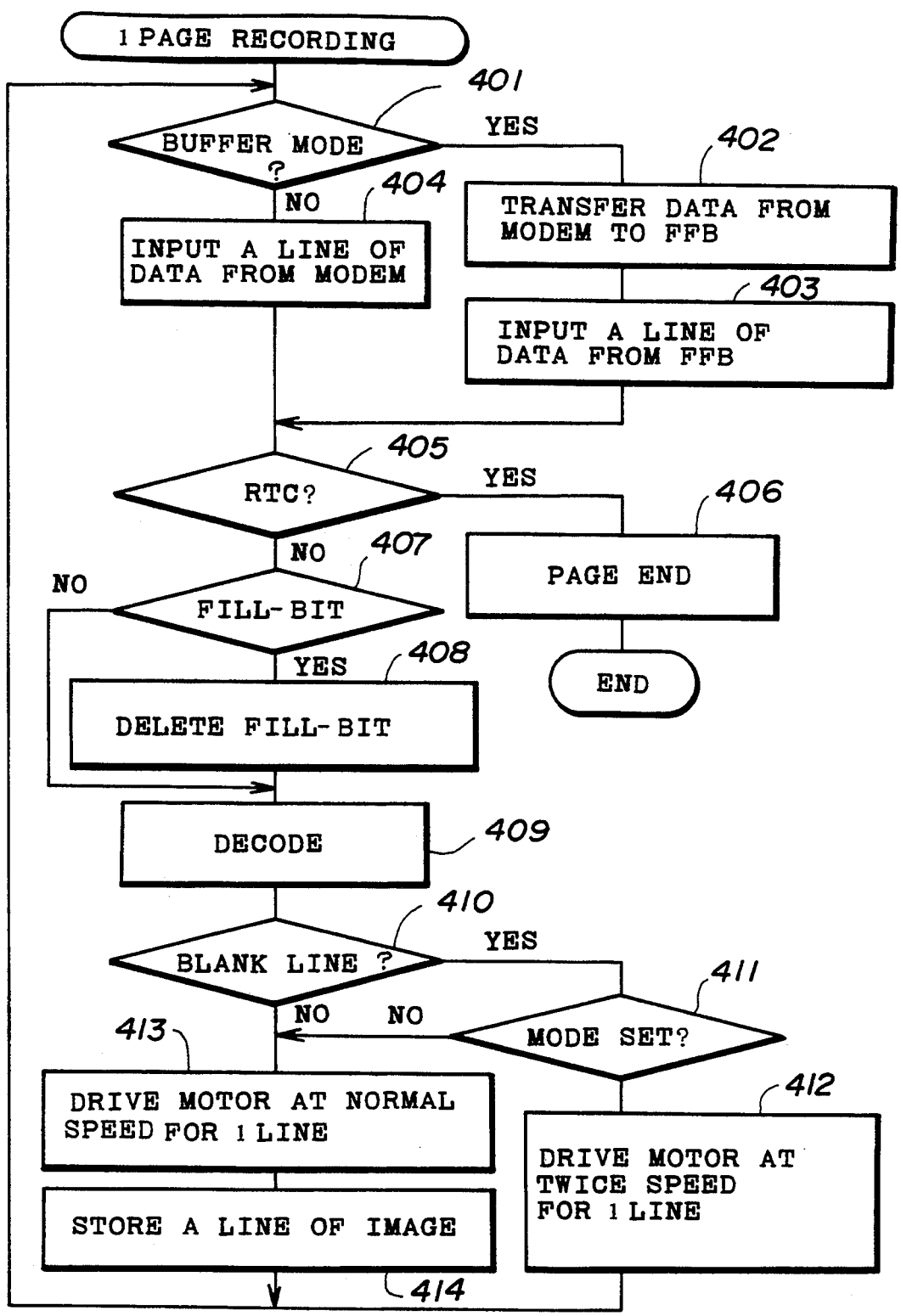
FIG. 7 shows a data for a 1 page plotting procedure of the facsimile apparatus.
Figure 8A:
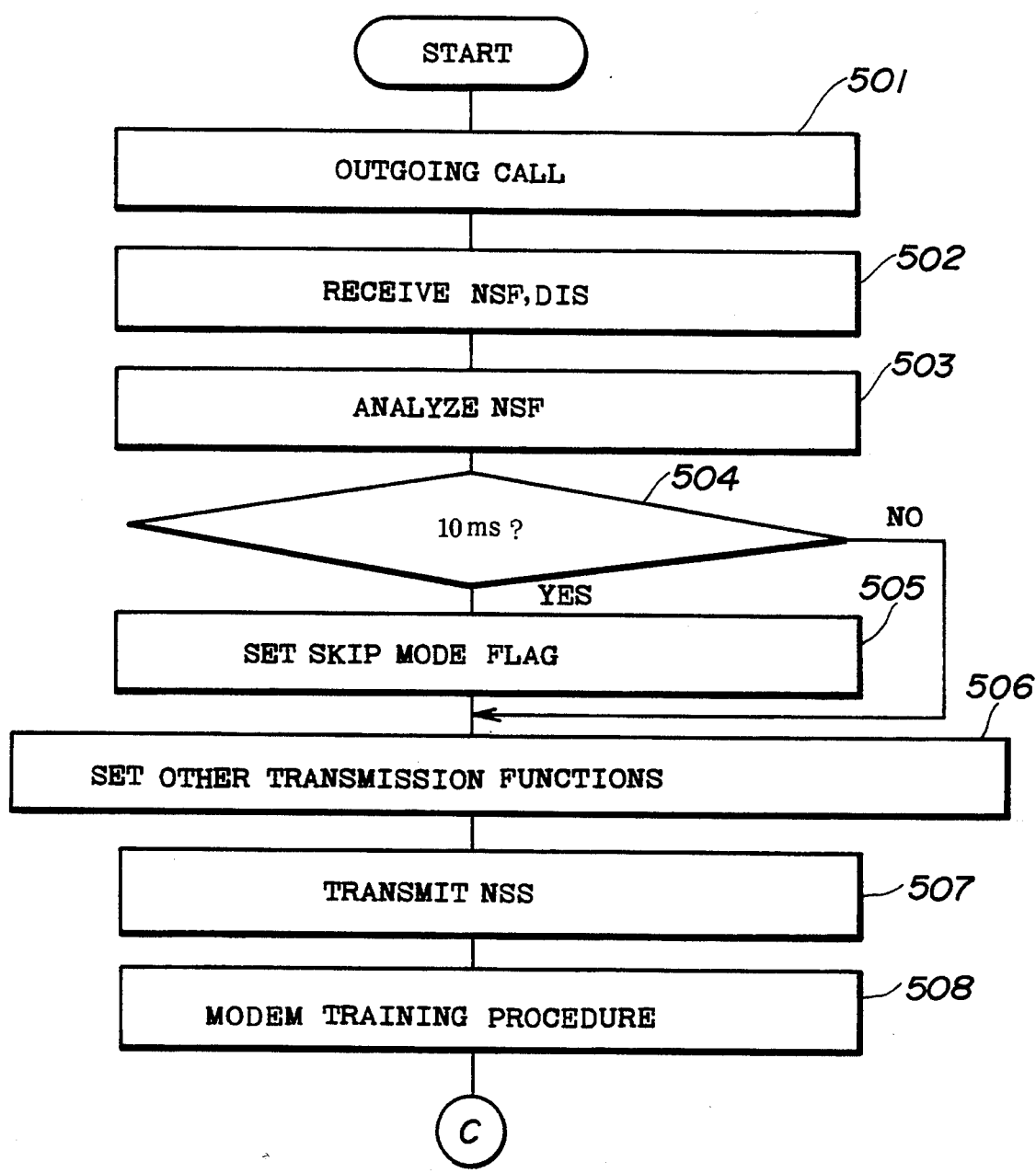
FIG. 8 shows another example of the data transmission procedure of the facsimile apparatus.

FIG. 7 shows a 1 page recording procedure of this FAX. First, a step 401 judges whether or not the buffer mode flag is set. If the step 401 judges YES, a step 402 stores the reception data in the FIFO buffer FFB, and a step 403 inputs the data for 1 line to a top end of the data recording area of the FIFO buffer FFB. If the buffer mode is not set so that the step 401 judges NO, a step 404 inputs the reception data for 1 line of this FAX to the top end of the data recording area of the FIFO buffer FFB. In this way, after reception data for 1 line is inputted, a step 405 judges whether or not the RTC represents the end of the page. If the step 405 judges YES, a step 406 sets the status signal representing the ending of the 1 page image recording.

If the step 405 judges NO, a step 407 judges whether or not the fill-bit is added to the image data. If the step 407 judges YES, a step 408 omits the fill-bit in order to form an encoded data having 1 line. Next, a step 409 decodes the image data into the image signal via the encoder/decoder 7, and a step 410 judges whether or not the line is the blank line.

If the step 410 judges YES, a step 411 judges whether the skip mode flag or the buffer mode flag is set. If the step 411 judges YES, a step 412 drives a motor which feeds a recording paper twice as fast as the normal speed. But if the steps 410 and 411 respectively judge NO, a step 413 drives a feed motor at a normal speed to feed the recording paper at a normal speed for 1 line. A step 414 records the image for 1 line. Then the procedure is transferred to the step 401. Therefore, the blank line is recorded at a speed twice as fast as the normal speed when the skip mode is designated, so that the receiver is synchronized with the operation of the transmitter concerning the line. On the other hand, the processing time of the blank line is limited to ½ that of the normal line when the buffer mode is designated.

As mentioned above, in this embodiment, since the transmission mode set is that appropriate to the minimum recording time for 1 line of the receiver, the image data transmission operation is optimized for each minimum recording time.

Incidentally, although the image data transmission time is shortened by designating either the skip mode or the buffer mode in the above embodiments, the transmitter can shorten the image data transmission time by monitoring the consuming amount at the FIFO buffer FFB of the receiver.

A description will now be given of another example of the transmitting procedure of this FAX with reference to FIG. 7. First, a step 501 transmits the outgoing call to the terminal, and the step 502 receives the NSF and the DIS. A step 503 analyzes the NSF. A step 504 judges whether or not the skip mode can be used. If the step 504 judges YES, a step 505 sets the skip mode flag. A step 506 sets the other transmission functions, and a step 507 transmits the NSS to the terminal. A step 508 executes the MODEM training procedure at a transmission speed. Next, a step 509 calculates the minimum confirmation bit number NA based on the minimum recording time and the transmission speed, and then sets the standard value NB which is generated by subtracting a predetermined value, for example, 600, from the data capacity of the FIFO buffer FFB. And then a step 510 scans the image for 1 page. Subsequently, a step 511 judges whether or not the data is stored in the FIFO buffer FFB. If the step 511 judges YES, a step 512 transmits the image data from the FIFO buffer FFB to the G3 facsimile MODEM 9. On the other hand, if the step 511 judges NO, a step 513 monitors if the image data for 1 page has been transmitted. If the step 513 judges YES, a step 514 judges whether or not the next document page is set at the scanner 4. If the step 514 judges YES, a step 515 transmits the MPS to the terminal and a step 516 receives the response signal therefrom. If the step 514 judges NO, a step 517 transmits the EOP to the terminal. A step 518 receives the response signal from the terminal, a step 519 transmits the DCN, and a step 520 clears the line.

Figure 9A:
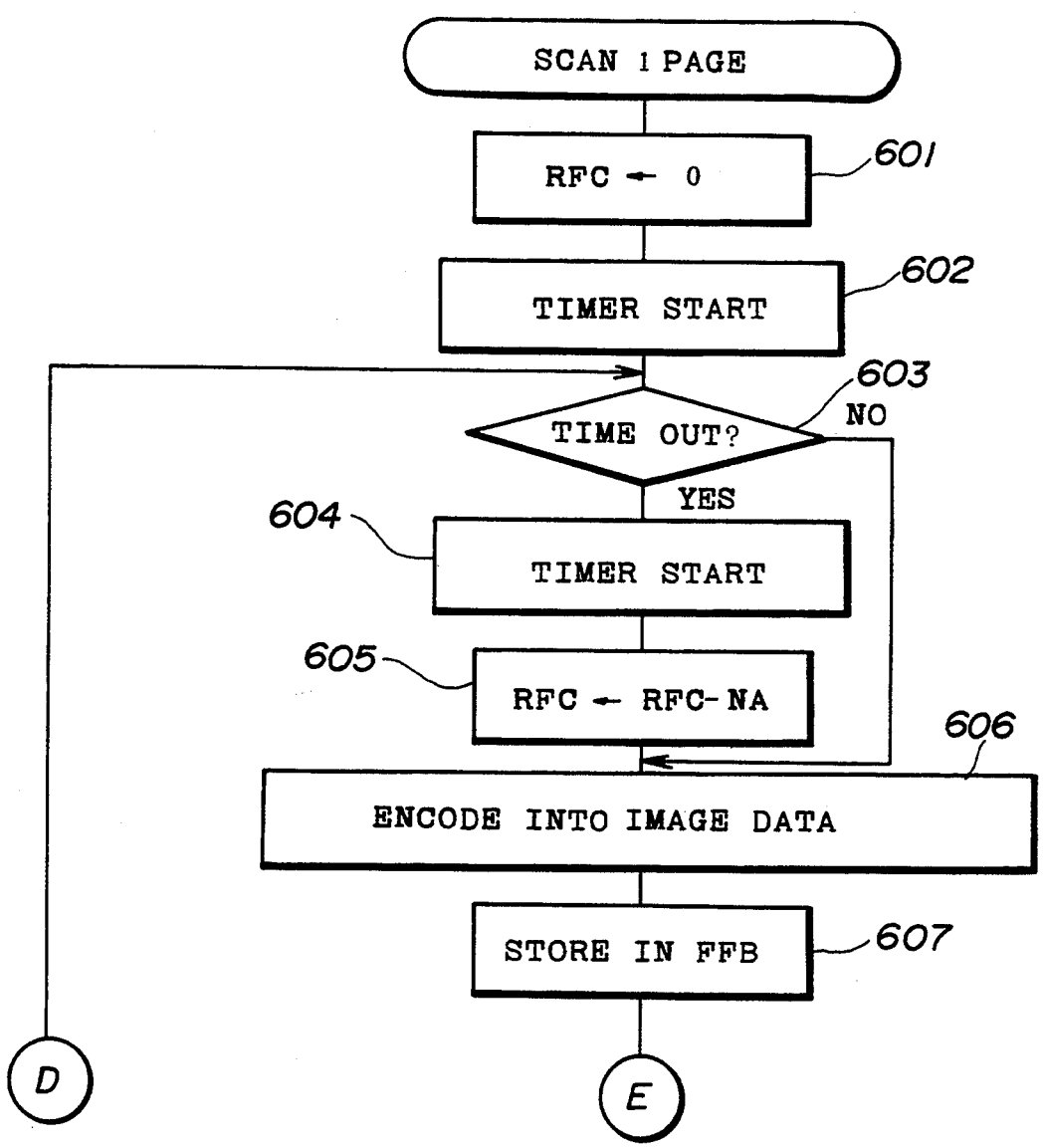
FIG. 9 shows another example of the data reception procedure of the facsimile apparatus.
Figure 9B:
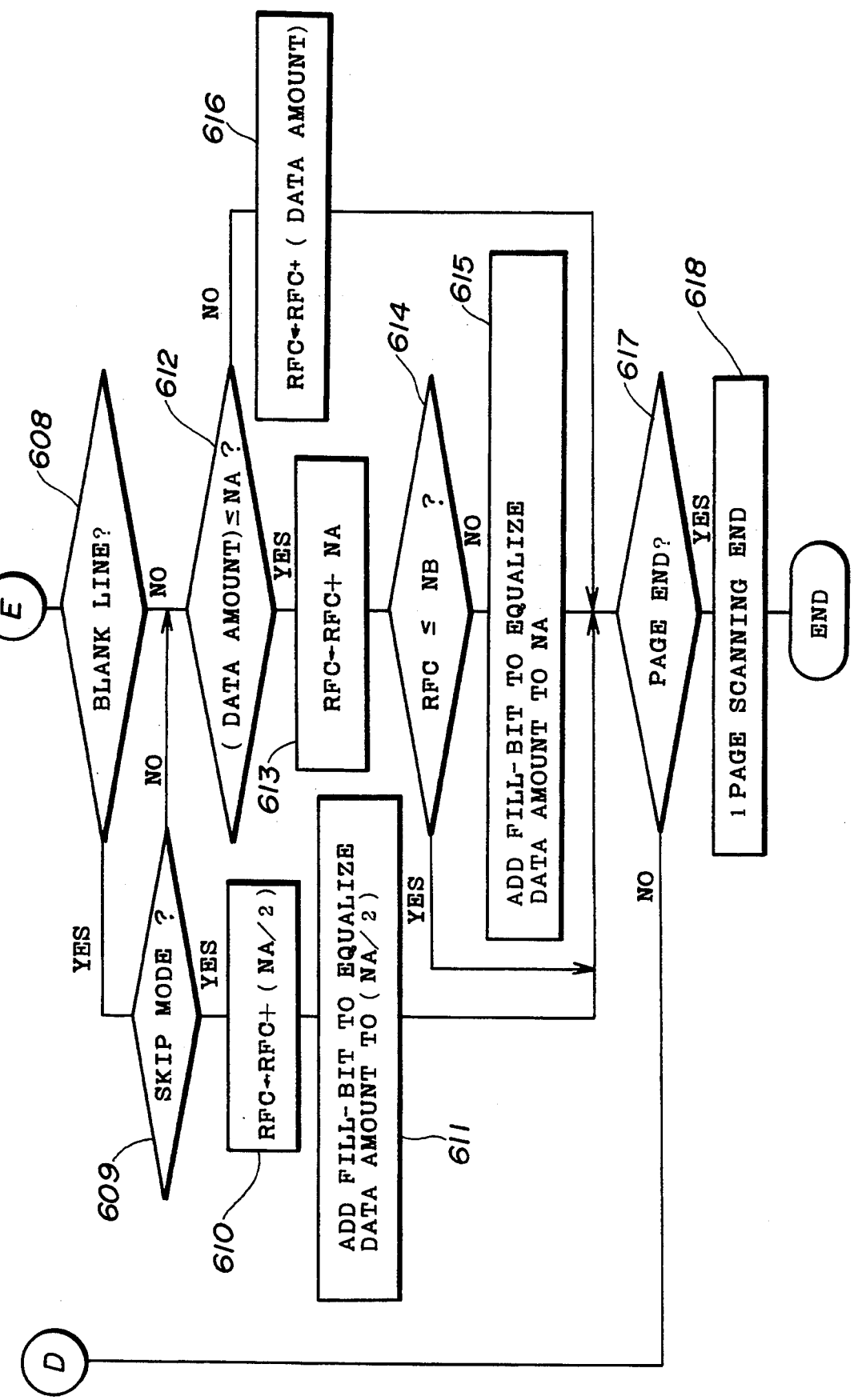

FIG. 9 shows a 1 page scanning process. Incidentally, in this process, a processing time for 1 page is 10 ms.

First, a step 601 initially sets a value of the counter RFC to 0 to monitor the data amount stored in the FIFO buffer FFB, and a step 602 starts the timer in which the minimum recording time for 1 line is set. In addition, a step 603 judges whether the timer is out of time. If the step 603 judges YES, a step 605 subtracts the minimum confirmation bit number NA from the counter RFC since a vacant area for 1 line generated in the FIFO buffer FFB of the receiver reaches 1 after the data for 1 line is plotted out. Next a step 606 stores the encoded data and the EOL in the FIFO buffer FFB via the scanner and the encoder/decoder 7. In this case, a step 608 judges whether or not a line to be processed is the blank line. If the step 608 judges YES, a step 609 judges whether or not the skip mode is set. If the step 609 judges YES, a step 610 adds the counter RFC to ½ of the minimum confirmation bit number NA, and a step 611 adds the fill-bit to the encoded image data stored in the FIFO buffer FFB so that the bit number of the image data for 1 line can be equal to ½ of the minimum confirmation bit number NA. If the step 608 judges NO, a step 612 judges whether or not the data amount of the encoded data and the EOL are below the minimum confirmation bit number NA. If the step 612 judges YES, a step 613 adds the counter RFC to the minimum confirmation bit number NA, and a step 614 judges whether or not the value of the counter RFC is less than the standard value NB.

If the step 614 judges NO, a step 615 adds the fill-bit to the encoded data of a line stored in the FIFO buffer FFB to equalize the bit number of the image data to the minimum confirmation bit number NA since the vacant area of the FIFO buffer FFB of the receiver is small. If the step 614 judges YES, the fill-bit is not added since the FIFO buffer FFB has a large enough vacant area.

If the step 612 judges NO, a step 616 adds the data amount of the encoded data and the EOL to the counter RFC. If the step 609 judges NO, the procedure is transferred to the step 612.

Then, a step 617 judges whether or not the encoded data for 1 line is processed. If the step 617 judges NO, the procedure is transferred to the step 603. However, if the step 617 judges YES, a step 618 sets the status representing the ending of the 1 page scanning in order to terminate the procedure.

In this way, during image data transmission, since the counter RFC is added to the transmitted data in the transmitter and the minimum confirmation bit number NA is subtracted in synchronization with the plotting timing of the image data for 1 line, the used amount of the FIFO buffer FFB of the receiver is stored in the counter RFC. If the value of the counter RFC is less than the standard value NB, the fill-bit is not added to the encoded data to be transmitted since the FIFO buffer FFB has a large enough vacant capacity. On the other hand, if the receiver has a skip mode, the transmitter processes in the skip mode.

Figure 10A:
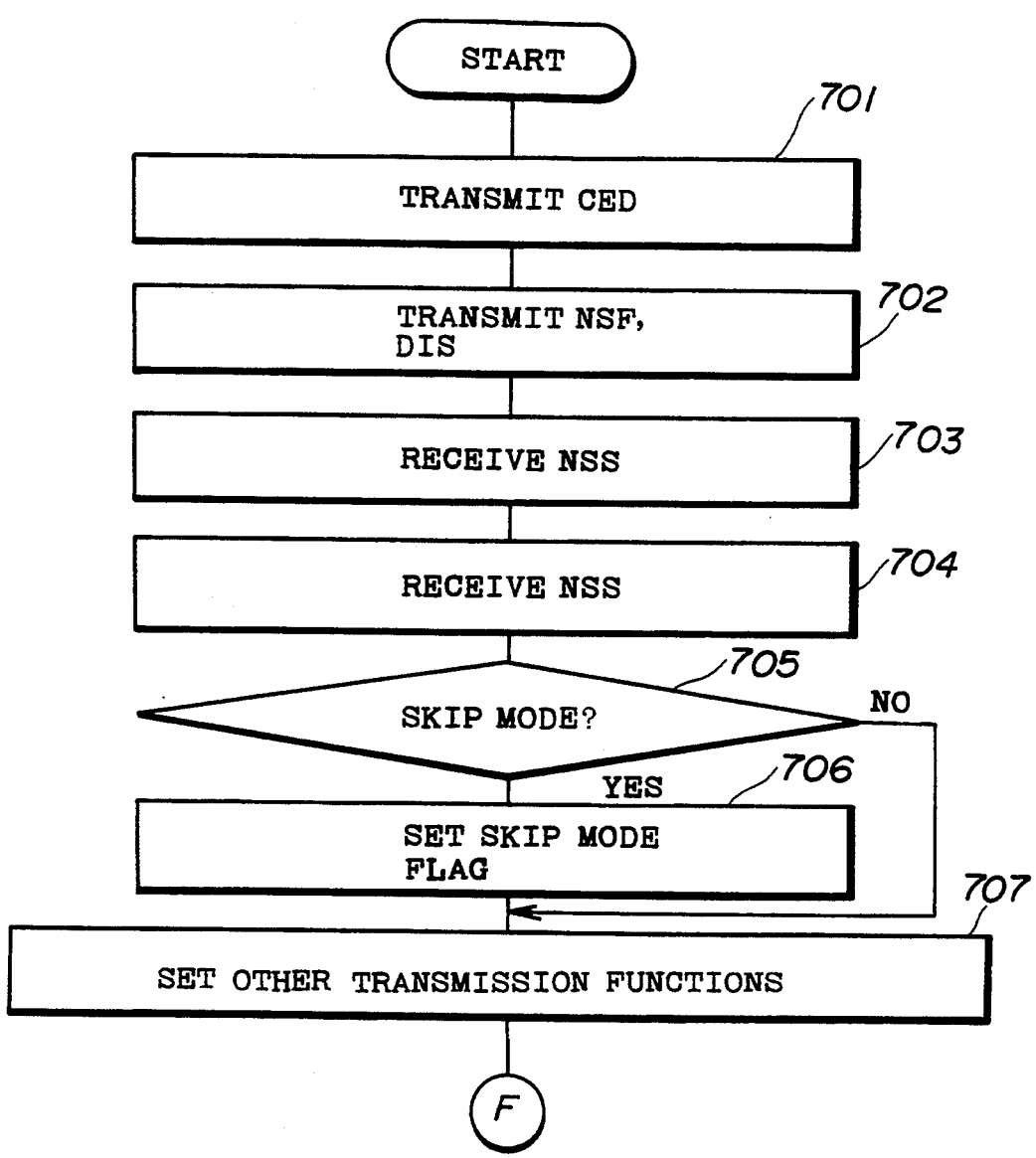
FIG. 10 shows another example of the data for a 1 page procedure of the facsimile apparatus.
Figure 10B:
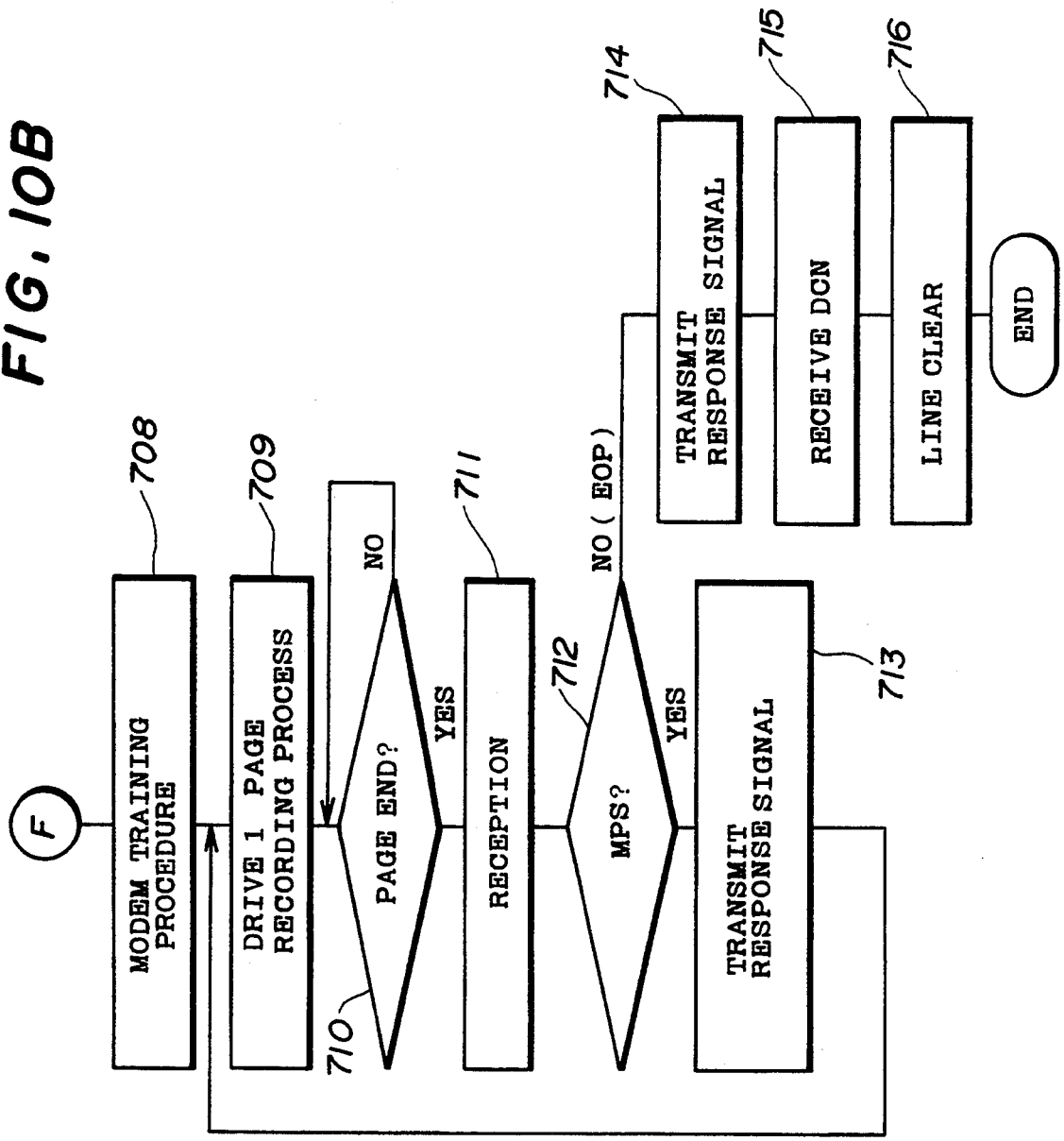

FIG. 10 shows a reception procedure of this FAX. First a step 701 transmits the CED when it detects the incoming call, and a step 702 transmits the NSF and the DIS to the terminal. Subsequently, a step 703 receives the NSS. A step NSS analyzes the NSS, and a step 705 judges whether or not the skip mode is set. If the step 705 judges YES, a step 706 sets the skip mode flag. Next, a step 707 sets the other transmission functions, and a step 708 executes the MODEM training procedure at a transmission speed. Thus, a step 709 drives the 1 page recording process for plotting a received image data for 1 page, and a step 710 waits for the plotting of the received image for 1 page. After the received image data for 1 page is plotted, a step 711 receives the message end signal, and a step 712 judges whether or not the signal is the MPS. If the step 712 judges YES, a step 713 transmits the response signal based on the image data reception result, and the procedure is transferred to the step 709.

If the step 712 judges NO, a step 714 transmits the response signal to the terminal. Then a step 715 receives the DCN, and a step 716 clears the line to terminate the procedure.

Figure 11:
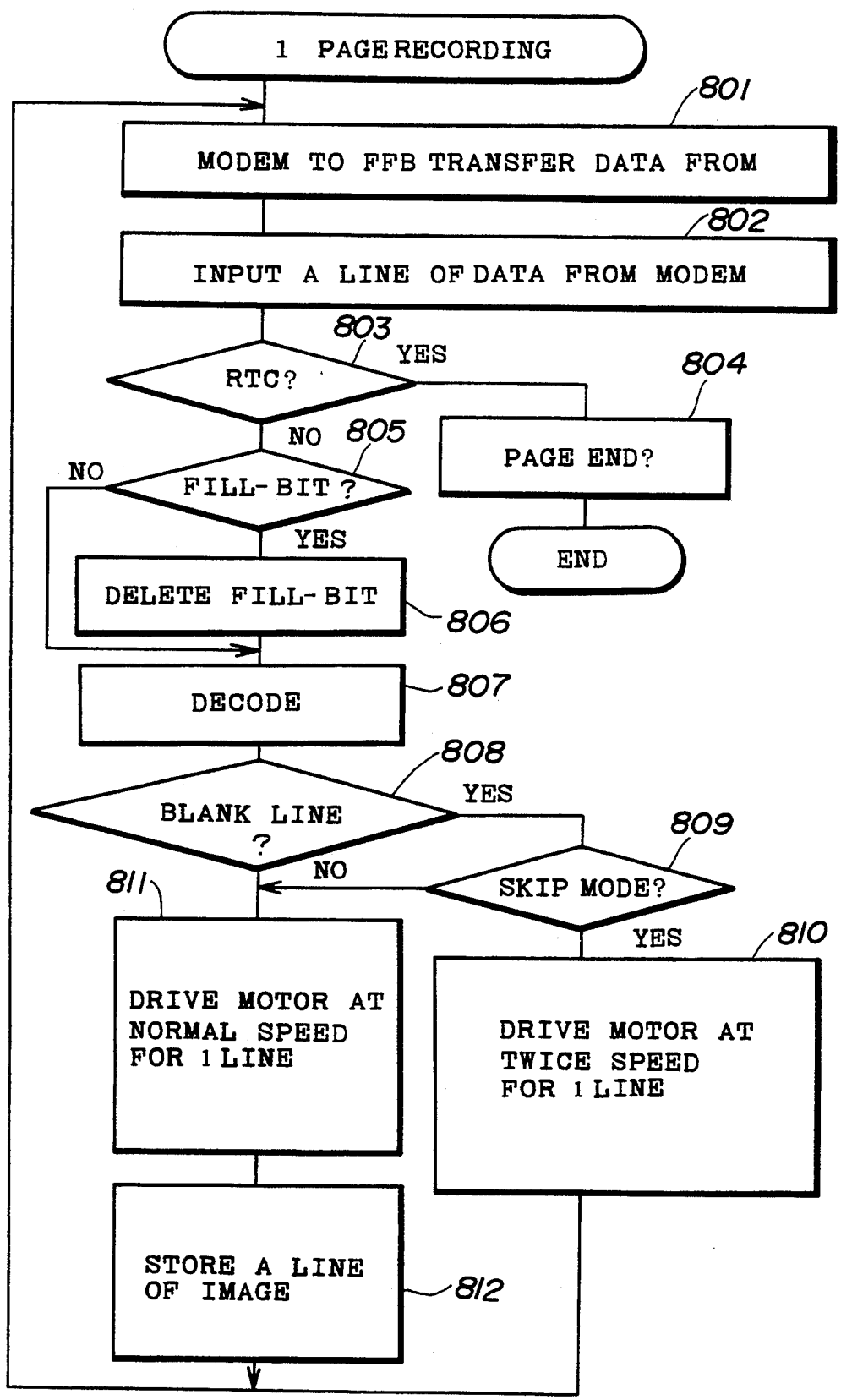

FIG. 11 shows a 1 page recording process performed at the step 709 in FIG. 10. First, a step 801 stores the received data of the G3 facsimile MODEM 9 in the FIFO buffer FFB, and a step 802 inputs the data for 1 line to an end part of the data storage area of the FIFO buffer FFB.

Subsequently, a step 803 judges whether or not the received data for 1 line is the RTC. If the step 803 judges YES, a step 804 sets the status signal to terminate the process since the image for 1 line is plotted. If the step 803 judges NO, a step 805 judges whether or not the fill-bit is added. If the step 805 judges YES, a step 806 omits the fill-bit to generate the encoded data for 1 line. Next, a step 807 decodes the image data for 1 line into the image signal via the encoder/decoder 7, and a step 808 judges whether or not the line is the blank line.

If the step 808 judges YES, a step 809 judges whether or not the skip mode flag is set. If the sets 809 judges YES, a step 810 drives the motor which feeds the recording paper at a speed twice as fast as the normal speed. However, if the step 808 judges NO, a step 811 drives the feeding motor at the normal speed, and a step 812 plots out the image for 1 line. Then the procedure is transferred to the step 801.

The present invention is applicable to another minimum recording time, such as 5 ms or 40 ms. In addition, the present invention can be applied to a case where the maximum speed of the facsimile apparatus becomes faster than 9600 bps.

Further, the present invention is not limited to these preferred embodiments, but various variations and modifications may be made without departing from the scope of the present invention.

What is claimed is:

1. A data link control method for controlling a receiver and a transmitter which communicate with each other in a predetermined mode, comprising the steps of:
   connecting the receiver and the transmitter so that the transmitter can transmit every line of a predetermined data on a recording paper thereof at a first speed, the receiver plotting every line of the predetermined data on a recording paper thereof at a second speed;
   selecting the predetermined mode from either a buffer mode or a skip mode on the basis of the ratio of the first speed to the second speed and whether a buffer mode can be used by the receiver;
   setting a capacity of a buffer in the transmitter to be smaller than a capacity of a buffer in the receiver when the buffer mode is selected; and
   storing the predetermined data including data corresponding to blank lines in the buffer in the receiver, the data corresponding to blank lines being stored in the buffer in the receiver without adding a fill-bit during the buffer mode and a fill-bit representing 0 being added to the data corresponding to blank lines during the skip mode so that the transmitting operation of the transmitter can be synchronized with the plotting operation of the receiver,
   the recording paper of the receiver being fed at a third speed higher than a normal speed when a blank line of the predetermined data is plotted thereon during the buffer mode and skip mode.

2. The method according to claim 1, wherein the third speed of the receiver is twice as fast as the normal speed during the buffer mode and the skip mode.

3. The method according to claim 1, wherein, in the buffer mode, a capacity of the buffer of the transmitter is limited to be a quarter of that of the receiver.

4. The method according to claim 1, wherein said method uses MH encoding method to coding the predetermined data.

5. The method according to claim 1, wherein the minimum value of said second speed is 5 ms per one scan line.

6. The method according to claim 1, wherein the minimum value of said second speed is 10 ms per one scan line.

7. A data link control method for controlling a receiver and a transmitter which communicate with each other in a predetermined mode, both the receiver and the transmitter having buffers in which every line of a predetermined data to be transmitted and/or received is temporarily stored, the transmitter transmitting every line of the predetermined data to the receiver at the first speed, and the receiver plotting every line of the predetermined data on a recording paper thereof at a second speed, comprising the steps of:
   connecting the receiver and the transmitter;
   transmitting the predetermined data without adding a fill-bit;
   monitoring a data amount of the predetermined data stored in the buffer in the receiver, the predetermined data being temporarily accumulated in the buffer in the receiver when the first speed is higher than the second speed; and
   controlling the first speed by adding a fill-bit to the predetermined data being transmitted to the receiver when the data amount in the buffer in the receiver is greater than a predetermined amount determined by the capacity of the buffer in the receiver.

8. The method according to claim 7, wherein said method monitors the data amount of the predetermined data stored in the buffers by using an up/down counter.

9. The method according to claim 7, wherein the capacity of the buffer of the transmitter is a quarter of that of the receiver.

10. The method according to claim 7, wherein the receiver informs the transmission of a minimum recording time representing the time it takes to plot the predetermined data for one line on the recording paper and the capacity of the buffer thereof to the transmitter.

11. The method according to claim 10, wherein the transmitter transmits a fill-bit representing 0 with the predetermined data to the receiver when the first speed is equal to or greater than the second speed so that the transmitting operation of the transmitter can be synchronized with the plotting operation of the receiver.

12. The method according to claim 7, wherein the minimum value of said second speed is 20 ms per one scan line.

13. The method according to claim 7, wherein the minimum value of said second speed is 40 ms per one scan line.

* * * * *